(12) United States Patent
Fox et al.

(10) Patent No.: US 9,990,178 B2
(45) Date of Patent: Jun. 5, 2018

(54) SOLVING A COMBINATORIAL PROBLEM USING A QUALITY METRIC VALUE OF A CHARACTERISTIC SOLUTION THEREOF

(71) Applicant: The Boeing Company, Huntington Beach, CA (US)

(72) Inventors: Barry Ross Fox, Ballwin, MO (US); Steven Jowers, Friendswood, TX (US)

(73) Assignee: THE BOEING COMPANY, Chicago, IL (US)

( * ) Notice: Subject to any disclaimer, the term of this patent is extended or adjusted under 35 U.S.C. 154(b) by 462 days.

(21) Appl. No.: 14/726,162

(22) Filed: May 29, 2015

(65) Prior Publication Data

US 2016/0350072 A1 Dec. 1, 2016

(51) Int. Cl.
G06F 7/46 (2006.01)
G06F 17/11 (2006.01)
G06Q 10/00 (2012.01)

(52) U.S. Cl.
CPC .............. *G06F 7/468* (2013.01); *G06F 17/11* (2013.01); *G06Q 10/00* (2013.01)

(58) Field of Classification Search
None
See application file for complete search history.

(56) References Cited

U.S. PATENT DOCUMENTS

| | | |
|---|---|---|
| 5,890,134 A | 3/1999 | Fox |
| 8,417,652 B2 | 4/2013 | Fox et al. |
| 8,543,524 B1 | 9/2013 | Fox et al. |
| 8,849,733 B2 | 9/2014 | Fox et al. |
| 8,983,881 B2 | 3/2015 | Fox et al. |
| 2007/0106545 A1 | 5/2007 | Jowees et al. |

OTHER PUBLICATIONS

Aiex et al., "TTTPLOTS: A Perl Program to Create Time-to-Target Plots," 2005, AT&T Labs Research Technical Report: TD-6HT7EL, 17 pages.

Aiex et al., "Probability Distribution of Solution Time in GRASP: An Experimental Investigation," Copyright 2002, Journal of Heuristics 8 (2002), pp. 343-373.

Avis, D., Davis, B., and Steele, J.M., "Probabilistic Analysis of a Greedy Heuristic for Euclidean Matching," Probability in the Engineering and Informational Sciences 2 (1988), pp. 143-156.

(Continued)

*Primary Examiner* — Alan Chen
(74) *Attorney, Agent, or Firm* — Womble Bond Dickinson (US) LLP

(57) ABSTRACT

A method is provided for solving a given combinatorial problem includes providing a function that has been established for a family of combinatorial problems including the given combinatorial problem. For each problem in the family, the function relates a secondary measure of the problem to a quality metric of a characteristic solution to the problem. The function may be applied to a value of the secondary measure for the given problem to obtain a value of the quality metric of the characteristic solution to the given problem. The given problem may be solved to obtain a solution to the given problem; and the solution evaluated based on comparison of a value of the quality metric of the solution, and the value of the quality metric of the characteristic solution. And in at least one instance based on the evaluation, the solution may be communicated to guide performance of a task.

21 Claims, 7 Drawing Sheets

(56) References Cited

OTHER PUBLICATIONS

Borgwardt, K. H., "Probabilistic Analysis of Optimization Algorithms—Some Aspects from a Practical Point of View," Acta Applicandae Mathematicae 10 (1987), pp. 171-210.
Bresina et al., "Search Space Characterization for a Telescope Scheduling Application," Copyright 1994, AAAI Technical Report FS-04-01, pp. 10-15.
Brglez et al., "Performance Testing of Combinatorial Solvers With Isomorph Class Instances," Copyright 2007, 2007 Workshop on Experimental Computer Science, Jun. 13-14, 2007, 12 pages.
Cheeseman et al., "Where the Really Hard Problems Are," Copyright 1991, Proceedings of the 12th International Joint Conference on Artificial Intelligence, vol. 1, pp. 331-337.
Cicirello, V. A., and Smith, S.F. 2004. "Heuristic Selection for Stochastic Search Optimization: Modeling Solution Quality by Extreme Value Theory," In Wallace, Mark ed. Principles and Practice of Constraint Programming—CP 2004. Springer, Berlin, 15 pages.
Debels et al., "A Hybrid Scatter Search/Electromagnetism Meta-Heuristic For Project Scheduling," Copyright 2004, European Journal of Operational Research 169 (2006), pp. 638-653.
Feo et al., "A Greedy Randomized Adaptive Search Procedure for Maximum Independent Set," 1989, Operations Research 42 (1994), 38 pages.
Fox, B. and Ringer, M., 1995, AAAI SIGMAN Planning and Scheduling Benchmarks, http://www.neosoft.com/benchmrx, 51 pages.
Fox et al., "Genetic Operators for Sequencing Problems," in: Foundations of Genetic Algorithms, Rawlins, Copyright 1991, Morgan Kaufmann Publishers, Inc., pp. 284-300, 21 pages.
Fox, B. "Non-Chronological Scheduling," Copyright 1990, AI, Simulation, and Planning in High Autonomy Systems, 1990, Proceedings.. IEEE, pp. 72-77.
Gonçalves et al., "A Biased Random-Key Genetic Algorithm with Forward-Backward Improvement for the Resource Constrained Project Scheduling Problem," Mar. 11, 2009, Copyright 2010, Technical Report, AT&T Labs Research, Florham Park, NJ, pp. 1-26.
Gonçalves et al., "A Genetic Algorithm for the Resource Constrained Multi-Project Scheduling Problem," European Journal of Operational Research 189 (2008), pp. 1171-1190.
Gonçalves et al., "A Hybrid Genetic Algorithm for the Job Shop Scheduling Problem," European Journal of Operational Research 167.1 (2005), pp. 77-95.
Gumbel, E.J., "Statistics of Extremes," 1958, Columbia University Press, 402 pages.
Hartmann et al., "A Survey of Variants and Extensions of the Resource-Constrained Project Scheduling Problem," European Journal of Operational Research 207 (2010), pp. 1-14.
Hartmann et al., "Experimental Evaluation of State-of-the-Art Heuristics for the Resource-Constrained Project Scheduling Problem," European Journal of Operational Research 127 (2000), pp. 394-407.
Hoos et al., "Towards a Characterisation of the Behaviour of Stochastic Local Search Algorithms for SAT," Copyright 1999, Artificial Intelligence 112 (1999), 21 pages.
Karam et al., "Recent Trends in Solving the Deterministic Resource Constrained Project Scheduling Problem," published Mar. 2013, Innovations in Information Technology (IIT), 2013 9th International Conference, pp. 1-6.

Karp, R.M. and Steele, J.M. "Probabilistic Analysis of Heuristics," 1985, In Lawler, E.L., Lenstra, J.K, Rinnooy Kan, A.H.G, and Shmoys, D.B. eds. The Traveling Salesman Problem, John Wiley & Sons, pp. 181-205.
Kolisch et al., "PSPLIB—A Project Scheduling Problem Library: OR Software—ORSEP Operations research Software Exchange Program," European Journal of Operational Research 96 (1996), pp. 205-216.
Kolisch et al., "Experimental Investigation of Heuristics for Resource-Constrained Project Scheduling: An Update," Copyright 2005, European Journal of Operational Research 174.1 (2006), pp. 23-37.
Kolisch et al., "Heuristic algorithms for the resource-constrained project scheduling problem: Classification and computational analysis," in: Project Scheduling, Springer US, Copyright 1999, pp. 147-178.
Li et al., "An Iterative Scheduling Technique for Resource-Constrained Project Scheduling," European Journal of Operational Research 56 (1992), pp. 370-379.
Mendes et al., "A Random Key Based Genetic Algorithm for the Resource Constrained Project Scheduling Problem," Computers & Operations Research 36.1 (2009), pp. 92-109.
Mobini et al., "Using an Enhanced Scatter Search Aloorithm for a Resource-Constrained Project Scheduling Problem," Copyright 2008, Soft Comput 13 (2009), pp. 597-610.
Montana, D., "How to Make Scheduling Research Relevant," In Proceedings of the Genetic and Evolutionary Computation Conference, GECCO. vol. 2 (2002) 4 pages.
Nascimento et al., "GRASP Heuristic With Path-Relinking for the Multi-plant Capacitated Lot Sizing Problem," European Journal of Operational Research 200.3 (2010), pp. 747-754.
Noronha et al., "A Biased Random-Key Genetic Algorithm for Routing and Wavelength Assignment," Journal of Global Optimization 50.3 (2011), pp. 503-518.
Ozdamar et al., "A Note on an Iterative Forward/Backward Scheduling Technique with Reference to a Procedure by Li and Willis," European Journal of Operational Research 89 (1996), pp. 400-407.
Ozdamar et al., "A Survey on the Resource-Constrained Project Scheduling Problem," IIE Transaction 27, 1995, pp. 574-586.
Paraskevopoulos et al., "Solving Project Scheduling Problems with Resource Constraints via an Event List-Based Evolutionary Algorithm," Expert Systems with Applications 39 (2012) pp. 3983-3994.
Rardin, R. L. and Uzsoy, R., "Experimental Evaluation of Heuristic Optimization Algorithms: A Tutorial," Journal of Heuristics 7 (2001), pp. 261-304.
Ribeiro et al., "Exploiting Run Time Distributions to Compare Sequential and Parallel Stochastic Local Search Algorithms," 2009, MIC 2009: The VIII Metaheuristics International Conference; Hamburg, Germany, 52 pages.
Ribeiro et al., "On the Use of Run Time Distributions to Evaluate and Compare Stochastic Local Search Algorithms," Copyright 2009, Engineering Stochastic Local Search Algorithms, Designing, Implementing and Analyzing Effective Heuristics, pp. 16-30.
Streeter, M., "Using Online Algorithms to Solve NP-Hard Problems More Efficiently in Practice," Copyright 2007, Ph.D. Thesis, CMU-CS- 07-172, Department of Computer Science, Carnegie-Melon University, Pittsburgh, PA, 205 pages.
Valls et al., "A Hybrid Genetic Algorithm for the Resource-Constrained Project Scheduling Problem," European Journal of Operational Research 185 (2008), pp. 495-508.
Valls et al., "Justification and RCPSP: A Technique That Pays," Copyright 2004, European Journal of Operational Research 165 (2005), pp. 375-386.
Valls et al., "Resource-Constrained Project Scheduling: A Critical Activity Reordering Heuristic," Copyright 2002, European Journal of Operational Research 149 (2003), pp. 282-301.
Appendix A, Test Instances, pp. 181-228.

SOLVING A COMBINATORIAL PROBLEM USING A QUALITY METRIC VALUE OF A CHARACTERISTIC SOLUTION THEREOF

TECHNOLOGICAL FIELD

The present disclosure relates generally to solving combinatorial problems and, in particular, to solving a combinatorial problem using a quality metric value of a characteristic solution thereof.

BACKGROUND

It is well recognized that the construction or manufacture of any building, machine or equipment, generally referred to as a project, requires the collective performance of a number of individual operations or tasks for successful completion. Resources are required, as example, personnel, trained to accomplish the task, capital equipment and other resources, supplies and component parts, which need to be procured or built. Each task requires a finite time, determined by past experience, for completion. And precedence must be followed, in that some tasks typically must be completed before other tasks in the project may begin.

Prudence requires planning and, particularly, formulation of a schedule that defines the "who," "when," "where" and "how" that is necessary for completion of the project in an orderly and efficient manner. In earlier eras, the foreman or manufacturing engineer possessed the experience, training and intellect to arrange the tasks required by the project in mind and specify which persons were to carry out the tasks, the resources and supplies required, and other necessary details. That person could also provide a reasonable estimate of the time of completion as allowed prediction of a delivery date.

As modern factory projects attained greater complexity, schedules required better definition and were more scientifically defined by persons, often now referred to as industrial engineers. With essentially pen, ink and calculator, such persons were able to search through the requirements and present the paper documents defining the tasks and the resources associated with them and to arrange the order of (sequence) tasks for completion, creating timelines of individual tasks and chronological order of the tasks commencement and completion, namely, produce a project schedule. As projects became more complex still, those scheduling techniques often proved inefficient and, while less than perfect, necessarily sufficed until the advent of automated calculating machinery, such as modern scheduling systems.

To construct a modern aircraft involves many thousands of individual tasks, a vast number of technicians and assemblers, and a large amount of resources. To prepare a schedule for such a project would likely overwhelm the genius of any person working with pen, paper and calculator and would require an inordinate amount of time for one person or even a group of people to schedule to completion with minimal errors. One should not expect that the definition of a schedule to construct an aircraft should require preparation time that exceeds the construction time of an aircraft, disregarding the realism which necessitates redefining the schedule when tasks are not completed on time as originally planned, as for example due to acts of force majeure, such as electrical failure or flood.

Further compounding the difficulty of preparing a schedule for a complex project, in the modern competitive industrial world, resources including personnel and equipment are often held to a minimum and must be allocated. Little excess personnel or equipment is available to a manufacturer. Excess resources are expensive to maintain and, if carried idle by the manufacturer for too long, results ultimately in financial collapse attributed to inefficiency. Thus, the usefulness of a schedule as an industrial tool and the benefit of efficient scheduling is well understood.

A number of scheduling systems and sequencing systems are information systems for solving complex combinatorial problems, and are often used in industry to manage the allocation of resources and personnel amongst various projects. In computational complexity theory, combinatorial optimization problems are frequently classified as "NP-hard," and in real-world applications it is impossible to calculate a truly optimal solution to an NP-hard combinatorial problem using practical quantities of computational resources for practical periods of time.

Mathematicians and computer scientists have developed various approaches for finding good solutions (as opposed to singularly-optimal solutions) for combinatorial problems such as resource-constrained project scheduling (RCPS) and the traveling salesman problem (TSP), and such approaches may frequently be applied to more than one form of combinatorial problem. A number of differing implementations of such known solution approaches have been developed for various types of industries, types of users, types of computer hardware and the like. Consequently, the marketplace for such information systems (often termed "combinatorial solvers") includes a range of competing options that have varying features, capabilities, and/or underlying solution approaches, and prospective purchasers face a need to evaluate at least a subset of those competing options prior to making a decision to use one of them.

The "quality" of a solution to a combinatorial problem may be measured in a number of different manners, and its quality may be related to the "cost" of formulating the respective solution. In scheduling a multitask project, for example, one measure of schedule quality may be the duration between start of the first scheduled task and completion (finish) of the last scheduled task, sometimes referred to as "span time" or "cycle time." One example measure of schedule cost may be the time required to complete the process of formulating a schedule, that is, for the computer to execute the algorithms and process the entered task data to generate and display the schedule, often referred to as the "execution time."

Scheduling systems, and more generally combinatorial solvers, are not created equal and vary widely in quality. Many scheduling systems either use simple methods that have low cost (e.g., low execution time), but produce schedules with inferior quality (e.g., high cycle time), or use methods that produce schedules of higher quality, but at an undesirably-high cost. These systems may, for example, produce tasks that require too much time for project completion, or require too much time to formulate the schedule.

A number of techniques for measuring the effectiveness of a combinatorial solver to solve a combinatorial problem rely on a quality metric (criterion of quality, or sometimes more simply "metric") of its solutions (e.g., cycle time), and values of that quality metric for solutions obtained by the solver relative to the value for the optimal solution. But these techniques presuppose that the optimal solution and accordingly its quality metric are known. While this may be possible for smaller combinatorial problems, in general, the optimal solution and hence its quality metric are not possible to obtain, at least not without expending extraordinary computing resources.

It may therefore be desirable to have an apparatus and method that addresses these challenges, and improves upon existing practices.

BRIEF SUMMARY

Example implementations of the present disclosure are directed to an improved apparatus, method and computer-readable storage medium for solving a given combinatorial problem. In accordance with example implementations, the value of the quality metric of the optimal or another characteristic solution to a combinatorial problem may be obtained, and without the optimal solution and hence the computing resources required to obtain the optimal solution. Even in the absence of the optimal solution, the value of its quality metric may be of considerable use. For example, the quality metric value may be useful to guide search for good solutions, or as a decision criterion in instances in which the quality metric value is unsatisfactory. And in another example, the quality metric value of the optimal solution may be useful as to guide reformulation of the problems to make them more tractable and more acceptable.

The present disclosure thus includes, without limitation, the following example implementations. In some example implementations, a method is provided for solving a given combinatorial problem. The method includes providing a function that has been established for a family of combinatorial problems including the given combinatorial problem. For each combinatorial problem in the family, the function relates a secondary measure of the combinatorial problem to a quality metric of a characteristic solution to the combinatorial problem. The method also includes applying the function to a value of the secondary measure for the given combinatorial problem to obtain a value of the quality metric of the characteristic solution to the given combinatorial problem. The method includes solving the given combinatorial problem to obtain a solution to the given combinatorial problem; and evaluating the solution based on comparison of a value of the quality metric of the solution, and the value of the quality metric of the characteristic solution. And the method includes in at least one instance based on the evaluation, communicating the solution to guide performance of a task.

In some example implementations of the method of the preceding or any subsequent example implementation, or any combination thereof, the characteristic solution to the combinatorial problem is an optimal solution to the combinatorial problem, or a best solution to the combinatorial problem obtainable by a given combinatorial solver. In these example implementations, applying the function to the value of the secondary measure includes applying the function to the value of the secondary measure to obtain a value of the quality metric of the optimal solution or the best solution to the given combinatorial problem.

In some example implementations of the method of any preceding or any subsequent example implementation, or any combination thereof, the quality metric of the characteristic solution is an average quality metric of all solutions to the combinatorial problem in a solver-solution space, and the characteristic solution to the combinatorial problem is a solution in the solver-solution space having the average quality metric value. In these example implementations, applying the function to the value of the secondary measure includes applying the function to the value of the secondary measure to obtain an average of the quality metric of all solutions to the combinatorial problem in the solver-solution space.

In some example implementations of the method of any preceding or any subsequent example implementation, or any combination thereof, the secondary measure is a size of the combinatorial problem, or a function of the size of the combinatorial problem.

In some example implementations of the method of any preceding or any subsequent example implementation, or any combination thereof, the secondary measure is an average of the quality metric of all solutions to the combinatorial problem in a problem-solution space or a solver-solution space, or the standard deviation of the average of the quality metric.

In some example implementations of the method of any preceding or any subsequent example implementation, or any combination thereof, the method further comprises establishing the function from a plurality of second combinatorial problems in the family of combinatorial problems. In these example implementations, establishing the function includes solving the plurality of second combinatorial problems to obtain characteristic solutions thereto, with the plurality of second combinatorial problems having respective values of the secondary measure. And establishing the function includes establishing the function from the respective values of the secondary measure, and respective values of the quality metric of the characteristic solutions to the plurality of second combinatorial problems.

In some example implementations of the method of any preceding or any subsequent example implementation, or any combination thereof, the method further comprises generating the family of combinatorial problems including the plurality of second combinatorial problems from the given combinatorial problem, with each of the plurality of second combinatorial problems being a sub-problem of the given combinatorial problem.

In some example implementations, an apparatus is provided for implementation of a system for solving a given combinatorial problem. The apparatus comprises a processor and a memory storing executable instructions that in response to execution by the processor cause the apparatus to at least perform the method of any preceding example implementation, or any combination thereof. This may include implementation of subsystems of the system, such as a function store, calculator, combinatorial solver, evaluator, relation-analysis module and/or problem generator, configured to perform steps of the method.

In some example implementations, a computer-readable storage medium is provided for solving a given combinatorial problem. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
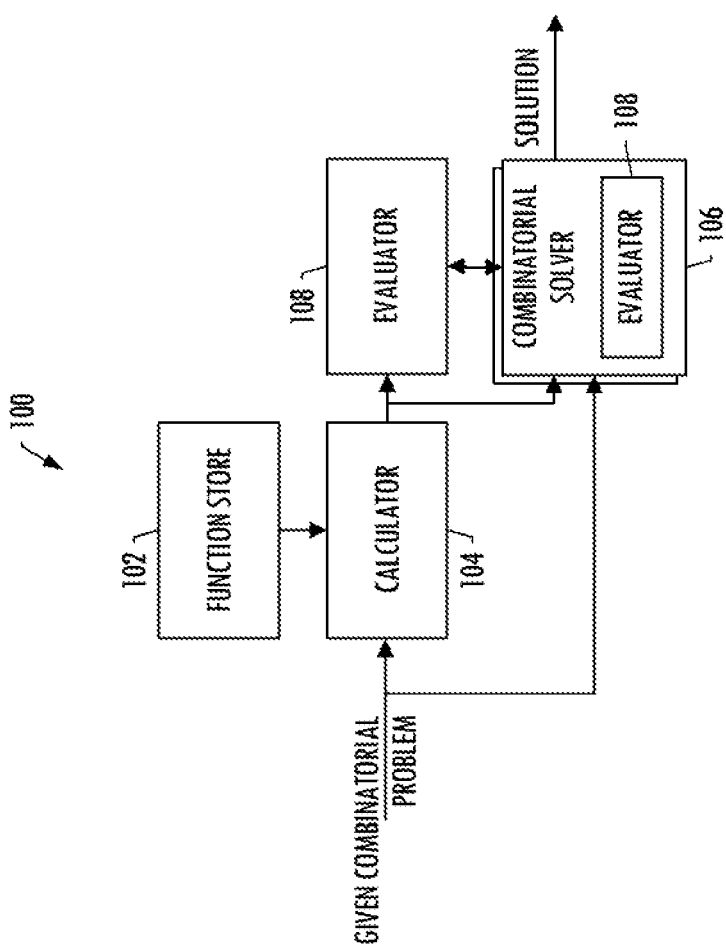
FIGS. 1, 2, 3 and 4 illustrate a system for solving a given combinatorial problem, according to various example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Example implementations of the present disclosure relate generally to solving combinatorial problems (primarily those classified as NP-Hard) and, in particular, to solving a combinatorial problem using a quality metric value of a characteristic solution such as the optimal solution thereof. Today, the only known technique for obtaining the quality metric value of the optimal solution is to literally attempt to find the optimal solution and in doing so, some boundary estimates (the quality metric value of the optimal solution will be no greater than this number and no less than this other number). In many cases, this approach requires development of special algorithms and computer programs to create these bounding estimates, requiring considerable expertise, time and cost.

Example implementations may obtain the quality metric value of a characteristic solution such as the optimal solution to a given combinatorial problem, even where the time and computing resources required to obtain the optimal solution grows exponentially with the size of the problem, and where the time and computing resources required to find an optimal solution may be prohibitive. Example implementations are based on the principle that a given combinatorial problem may be in a family of combinatorial problems. That is, combinatorial problems may be divided into problem types (e.g., RCPS, TSP); and within problem types, combinatorial problems may be divided into families with similar structure (e.g., the geometric arrangement of cities in a TSP), and can be further divided by size (e.g., the number of cities within a TSP).

This family of combinatorial problems may include a given combinatorial problem, but may also include smaller problems for which it may be possible to find optimal solutions. In accordance with example implementations, a (mathematical) function may be established for the family based on the quality metric values of these optimal solutions. That is, a function may be established for the family whereby for each combinatorial problem in the family, the function may relate a secondary measure of the combinatorial problem to the quality metric. Examples of suitable secondary measures include the problem size or a function thereof (e.g., square root or logarithm), or average quality metric value or its standard deviation over all solutions in the problem-solution space or a solver-solution space.

A useful function may be established by focusing on specific combinatorial problem types, and combinatorial problems within a family, and by investigating how the quality metric values and secondary measure values are related. A number of experiments may be performed on small problems in the family (where it is possible to find optimal solutions) to determine a function between the quality metric and secondary measure. Then, if the value of the secondary measure for a given combinatorial problem in the family is obtained, the function may be applied to it to obtain the value of the optimal solution to the given combinatorial problem, without obtaining or knowing the optimal solution itself (the optimal solution being unknown).

Example implementations of the present disclosure may improve a number of technologies, including computing technology for solving combinatorial problems, and technologies that make use of solutions to combinatorial problems. To illustrate the impact of example implementations on computing technology, consider that computing technology has gone through many years of constant improvement in capability, including in processor speed, and in the amount of useful primary and secondary memory. That progress is now effectively stalled, waiting on new radical changes in processor circuits and materials. As evidence, most commercially-available processors operate at a clock speed less than 4 GHz, and smaller processors designed to conserve energy operate at a clock speed less than 2 GHz. What has changed is that manufacturers now provide multi-core processors that enable concurrent execution of more computer programs.

High-value, computationally-intensive computer processes have benefited from improvements in process speed in past years. However, many combinatorial solvers and in particular complex combinatorial solvers cannot be easily re-engineered to make use of multi-core processors. Improvements in performance of these combinatorial solvers have up to now awaited changes in processor technology or other innovations.

Example implementations of the present disclosure may improve the performance of combinatorial solvers on existing technology by enabling them to obtain higher-quality, less-costly solutions. Example implementations may be used to obtain the quality metric value of optimal solutions to combinatorial problems using a simple, lower-cost algorithm, and then to use that quality metric value to improve the speed and quality of solutions returned by a combinatorial solver. This ability to estimate the quality metric value of optimal solutions to combinatorial problems using simpler, lower-cost algorithms may improve the performance of existing computer technology when used to execute high-value, compute-intensive computer processes.

Example implementations will be primarily described in conjunction with combinatorial solvers for solving problems such as resource-constrained project scheduling (RCPS), the traveling salesman problem (TSP), the knapsack problem, the stock cutting problem, and the like. It should be understood, however, that example implementations may be utilized in conjunction with a variety of other combinatorial solvers or combinatorial problems, such as those identified above.

Combinatorial problems such as RCPS, TSP, the knapsack problem, the stock cutting problem and others have a number of different applications that may benefit from example implementations of the present disclosure. For example, RCPS-type combinatorial problems may be used to by scheduling systems for scheduling tasks that collectively complete a project such as construction or manufacture of a building, machine or equipment (e.g., an aircraft). TSP-type combinatorial problems may be used to route manned or unmanned vehicles (e.g., motor vehicles, railed vehicles, watercraft, aircraft, spacecraft) to various locations such as for pickup, drop-off or delivery of passengers or objects (e.g., packages, munitions), performing tasks (e.g., test soil, service calls), or the like. TSP-type combinatorial problems may be used to schedule a machine to drill holes in a printed circuit board. In other examples, TSP-type combinatorial problems may be used to schedule a vehicle, machine or the like to direct a steerable camera, scanner or other sensor to capture images or otherwise obtain measurements of or from various objects such as celestial or ground-based objects, circuitry on a printed circuit board, or the like.

FIG. 1 illustrates a system 100 for solving a given combinatorial problem, according to some example implementations of the present disclosure. The system may include one or more of each of any of a number of different subsystems (each an individual system) for performing one or more functions or operations with respect to the given combinatorial problem. As shown, for example, the system may include a function store 102, a calculator 104, a combinatorial solver 106 (e.g., heuristic solver, optimal solver) and an evaluator 108 coupled to one another. Although being shown together as part of the system, it should be understood that any one or more of the function store, calculator, combinatorial solver or evaluator may function or operate as a separate system without regard to the other. And further, it should be understood that the system may include one or more additional or alternative subsystems than those shown in FIG. 1.

The function store 102 may be configured to provide a function that has been established for a family of combinatorial problems including the given combinatorial problem. A combinatorial problem may be defined by a number of attributes, and a family of combinatorial problems may be defined by combinatorial problems having one or more attributes the value of which is common to all of the combinatorial problems. A family of TSP-type combinatorial problems, for example, may include problems in which the points (e.g., cities) are arranged in a perfect grid. Other families may include problems in which the points have a uniform distribution, problems in which the points have a Gaussian distribution, and problems in which the points have another common, definable attribute.

For each combinatorial problem in the family, the function may relate a secondary measure of the combinatorial problem to a quality metric of a characteristic solution to the combinatorial problem. In some examples, the secondary measure is a size of the combinatorial problem, or a function (e.g., square root or logarithm) of the size of the combinatorial problem. In other examples, the secondary measure is an average of the quality metric of all solutions to the combinatorial problem in a problem-solution space or a solver-solution space, or the standard deviation of the average of the quality metric. The problem-solution space refers to the entire population of solutions to the combinatorial problem; and the solver-solution space refers to the population of solutions to the combinatorial problem obtainable by a given combinatorial solver (e.g., combinatorial solver 106).

The characteristic solution may be any of a number of different solutions according to which the problem or combinatorial solver for solving the given combinatorial problem may be characterized. In one example, the characteristic solution may be the optimal solution to the given combinatorial problem. There may be cases in which obtaining the optimal solution to the given combinatorial problem or others in its family may be entirely beyond current computational abilities. But there may be a heuristic combinatorial solver able to obtain good solutions to these combinatorial problems with reasonable time and effort; and there may be even better heuristic combinatorial solvers able to obtain better solutions (although perhaps more costly solutions). In some examples, then, the characteristic solution may be the best solution obtainable by the given combinatorial solver. The value of the quality metric of the best solution may then be used to decide whether to accept it or to expend the time and effort required to find the better solution through another combinatorial solver.

Accordingly, in some examples, the characteristic solution may be the optimal solution (e.g., in the problem-solution space), or the best solution obtainable by a given combinatorial solver (e.g., in its solver-solution space). In these examples, the calculator 104 may apply the function to obtain the value of the quality metric of the optimal solution or the best solution. In other examples, the characteristic solution may be a solution in the solver-solution space having the average quality metric value of all solutions in a solver-solution space. And in these examples, the calculator may apply the function to obtain the average of the quality metric of all solutions in the solver-solution space.

More generally, the characteristic solution may be any solution having a desired value of the quality metric. As indicated above, this may be the optimal solution, or the best solution obtainable by the given combinatorial solver. In another example, the characteristic solution may be a solution that has an average value of the quality metric in the problem-solution space or solver-solution space. In other examples, the characteristic solution may be a solution that has a maximum or minimum value of the quality metric in the problem-solution space or solver-solution space. Or the characteristic solution may be a solution that has any other desired value of the quality metric. This may be the case, for example, for a characteristic solution having a quality metric three standard deviations below the average, which may be useful because some solvers may generate good solutions but run so long that only 1000 iterations are feasible (yielding solutions that are three standard deviations below the average).

The calculator 104 may be configured to apply the function to a value of the secondary measure (sometimes referred to as "the secondary measure value") for the given combinatorial problem to obtain a value of the quality metric (sometimes referred to as "the quality metric value") of the characteristic solution to the given combinatorial problem, which in some examples may be an estimate of the value of the quality metric, and which in some examples may be measured in standard deviations. The combinatorial solver 106 may be configured to solve the given combinatorial problem to obtain a solution to the given combinatorial problem. The evaluator 108 may be configured to evaluate the solution based on comparison of a value of the quality metric of the solution, and the value of the quality metric of the characteristic solution. And the combinatorial solver may be configured to communicate the solution in at least one instance based on the evaluation to guide performance of a task. The task may be or in include any of a number of different tasks, depending on the combinatorial problem and its application. As indicated above and explained in greater detail below, examples of suitable tasks generally include tasks involving control of a motor or other actuator, or control of a sensor, which may be guided by the solution to the given combinatorial problem.

The evaluator 108 may be configured to evaluate the solution obtained by the combinatorial solver 106 based on the aforementioned comparison in one or more of any of a number of different manners. In some examples, the evaluator may operate outside the combinatorial solver to evaluate the solution in an evaluation to measure the effectiveness of the combinatorial solver to obtain solutions to the given combinatorial problem, as explained in greater detail below. Additionally or alternatively, in some examples, the combinatorial solver may include an integrated evaluator to evaluate the solution to improve performance of the combinatorial solver to generate a better, less-costly solution by assuming that the quality metric value of the optimal solution is either less than or greater than some given value. In this regard, the quality metric value of solutions obtained by the combinatorial solver may generally be better than solutions generated without the quality metric value of the optimal solution, but even with this optimal quality metric value, there is no guarantee that the combinatorial solver will find the optimal solution. In the absence of other information, the quality metric value of the optimal solution may serve as (appropriately) an upper or lower bound.

In some examples, the evaluator 108 may be configured to evaluate the solution obtained by the combinatorial solver 106 based on the aforementioned comparison to make decisions. In instances in which the value of the quality metric for the solution obtained by the combinatorial solver is close to the quality metric value of the optimal solution, the evaluator may decide (or be directed) to direct the combinatorial solver or another combinatorial solver to expend additional effort to find a better, perhaps optimal solution, or it may decide (or receive an indication) that the solution is close enough and no further effort is justified. In instances in which the value of the quality metric for the best solution obtainable by the combinatorial solver is close to that of the optimal solution, the evaluator may decide (or be directed) to use another combinatorial solver to obtain a solution (e.g., its best) that may be closer to optimal, or again, that the solution is close enough. In instances in which the value of an obtained solution (e.g., its best), is far from that of the optimal solution, where it may be prohibitively difficult to attempt to find a better or the optimal solution, the evaluator may decide (or be directed) to keep the obtained solution. But in instances in which the economic value of the given combinatorial problem is high, the evaluator may decide (or be directed) to use or investigate another combinatorial solver that may obtain a better solution.

In yet other examples, in instances in which the quality metric value of the characteristic (e.g., optimal) solution is unsatisfactory (the solution is not good enough), the evaluator 108 may decide (or be directed) that the work represented by the combinatorial problem (the application of the problem) needs refinement so that a better solution may be obtained and the work represented by the (refined) problem may be accomplished at lower cost.

More particular to the above, the combinatorial solver 106 in some examples may be configured to implement a branch-and-bound algorithm to solve the given combinatorial problem, and use the quality metric value of the characteristic (e.g., optimal) solution or a value slightly larger or smaller than that value as an initial bound on solutions considered for output. The combinatorial solver may repeatedly obtain random solutions to the given combinatorial problem until it finds one that has a quality metric value within a set percentage (e.g., 25%) of that of the optimal solution, at which point the combinatorial solver may refine that solution. During this refinement, then, the combinatorial solver may repeatedly reduce the set percentage (e.g., by 1%) and find a new refined solution within the reduced set percentage, until the combinatorial solver obtains a solution whose value is outside the reduced set percentage and starts again with a new random solution, or reaches a stopping point in which the solution's value is within a set percentage of that of optimal solution (e.g., 1%). The quality metric value of the optimal solution in this and similar examples allows the combinatorial solver to focus on solutions near the optimal, and judge whether the refinements are of value (e.g., making progress), and allows the combinatorial solver to know when to stop (when close to optimal) or go back to finding a new random solution (because the refinements are not making further progress).

Figure 2:
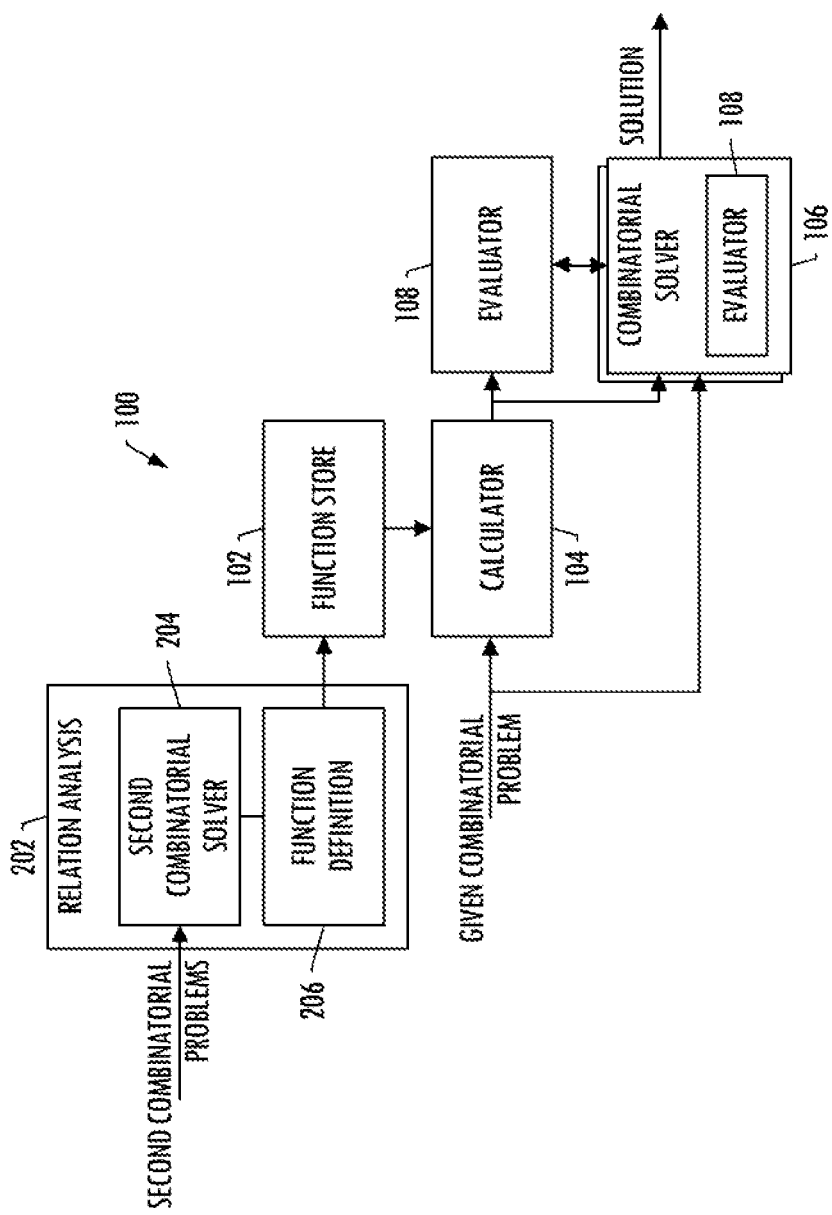

Turning now to the function relating the secondary measure to the quality metric of the characteristic solution, in some examples, the system 100 may not only provide the function, but the system may also establish the function. FIG. 2 illustrates the system according to some example implementations in which the system further includes a relation-analysis module 202 configured to establish the function from a plurality of second combinatorial problems in the family of combinatorial problems. As shown, the relation-analysis module may include a second combinatorial solver 204 and a function-definition module 206 coupled to one another. The second combinatorial solver may be the same or different from the combinatorial solver 106, and may be configured to solve the second combinatorial problems to obtain characteristic solutions thereto. These second combinatorial problems may have respective values of the secondary measure. The function-definition module, then, may be configured to establish the function from the respective values of the secondary measure, and respective values of the quality metric of the characteristic (e.g., optimal, best) solutions to the second combinatorial problems. The function may be established in any of a number of different manners, such as by conventional function fitting techniques like linear regression.

Figure 3:
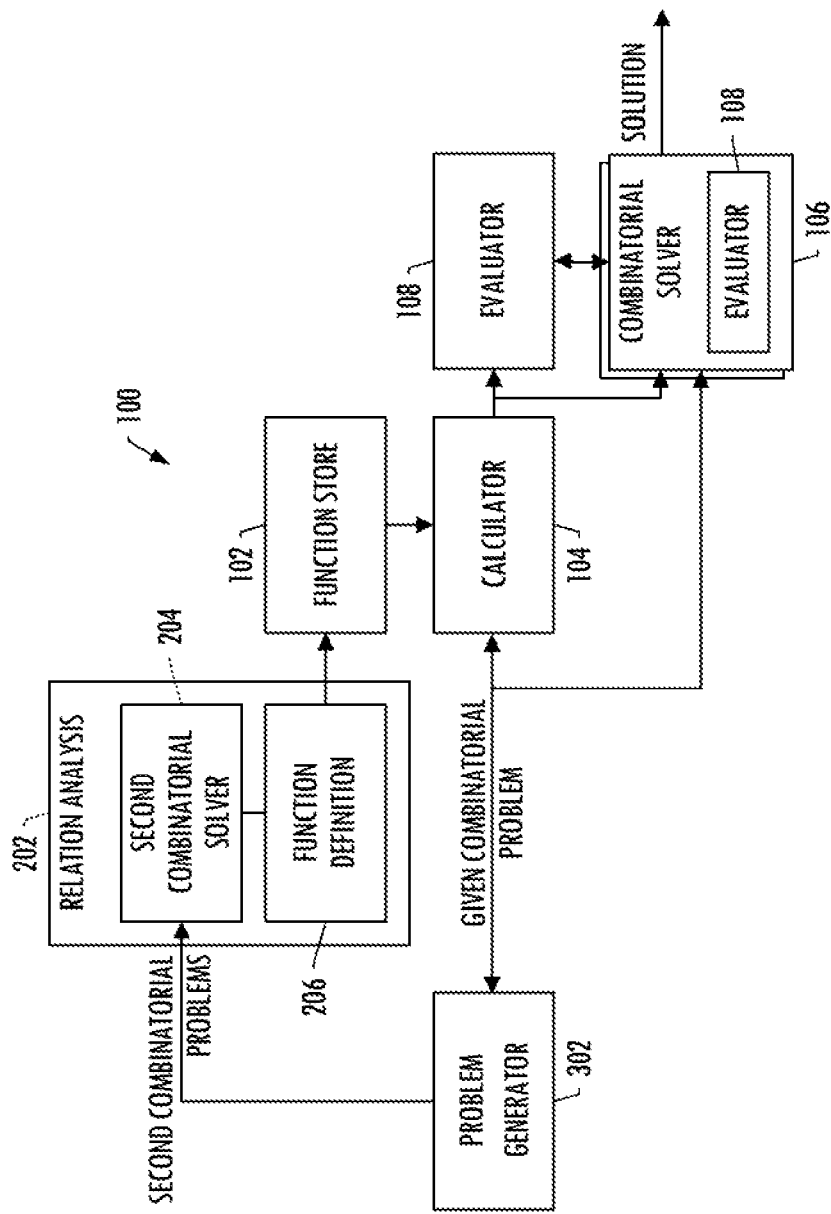

In some examples, a combinatorial problem may be defined by a unique set of attributes, such as in the case of a TSP-type problem for a printed circuit board in which holes to be drilled (the points) in the board are arranged in neither a perfect grid nor a random statistical distribution, nor any other previously-studied geometry. In these examples, the system 100 of example implementations may generate a family of combinatorial problems from the given combinatorial problem. FIG. 3 illustrates the system according to some example implementations in which the system even further includes a problem generator 302 configured to generate the family of combinatorial problems including the second combinatorial problems from the given combinatorial problem. In these examples, each of the second combinatorial problems may be a sub-problem of the given combinatorial problem. In the case of the aforementioned TSP-type problem, the system may generate a family of combinatorial problems with similar attributes by selecting one or more (up to all) of the holes to be drilled (points) for the printed circuit board. In a more general case, in some examples, problem generator may generate sub-problems for a given combinatorial problem by varying the size of the combinatorial problem.

TSPs may differ in the geometric spacing of their cities (or points). In some cases, that may be described as a grid, circle, line, or some statistical spacing such as uniform or Gaussian. All of these geometric categories have the property that there is a mathematical relationship between problem size and mean quality metric value (e.g., measured in standard deviations).

RCPS problems may be described by other means. The number of activities to be scheduled may define their size. Other attributes such as the number and complexity of precedence constraints, the average number of resource requirements (per activity), the number resource categories and the number of resources in each category, all determine how hard a combinatorial problem may be. If all of these attributes are scaled up or down as the number of activities are scaled up or down appropriately, the resulting combinatorial problems may fall within a single family.

In some examples, the problem generator 302 may be configured to generate sub-problems of the given combinatorial problem of a given size by keeping one or more parts of the problem unchanged, but for the remaining parts of the problem, changing attributes that contribute to the metric value so that their contribution to the metric value will be null or zero. In the case of a TSP of a given number of cities (by which its size is defined) in which the metric value depends on the distance between cities, for example, sub-problems may be generated by selecting subsets of the number of cities. Each sub-problem may be set relative to the TSP such that cities outside its subset yield a null or zero metric value (e.g., null or zero distance between cities outside the subset, or between a city in the subset and a city outside the subset).

Similarly, for a RCPS of a given number of activities (by which its size is defined) in which the metric value is schedule duration, sub-problems may be generated by selecting subsets of the number of activities. In each sub-problem, all of the resources and quantities in the RCPS may remain unchanged, but for activities outside the sub-problem's subset, two changes may be made. First, the durations of these activities may be set to zero; and second, their resource requirements may be deleted (equivalent to setting the required resource quantities to zero). A family of problems may therefore be generated where the resulting schedule durations may be determined only by the durations of the activities within the respective sub-problems.

Figure 4:
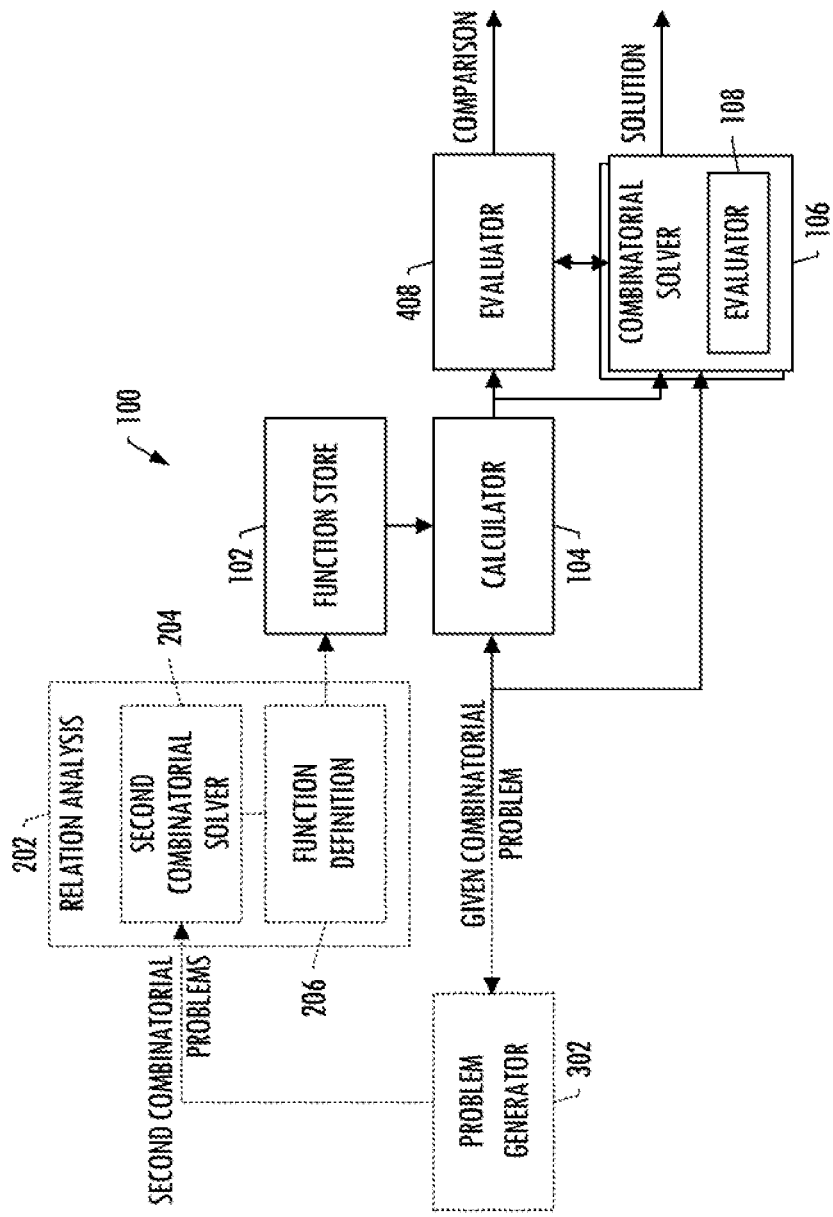

As explained above, the evaluator 108 may be configured to evaluate the solution obtained by the combinatorial solver 106 in an evaluation to measure the effectiveness of the combinatorial solver to obtain solutions to the given combinatorial problem. FIG. 4 illustrates the system 100 similar to that provided in any of FIGS. 1-3 including an evaluator 408 similar to the evaluator 108 of FIG. 1, but in which the evaluator 408 may be configured to compare an average of the quality metric of all solutions to the combinatorial problem in a solver-solution space of the combinatorial solver, to the value of the quality metric of the optimal solution for the given combinatorial problem. The evaluator may then communicate the comparison to guide performance of a task using a solution obtained by the combinatorial solver or another combinatorial solver.

In a more particular example, the evaluator 408 may be configured to calculate the difference between the quality metric value of a solution obtained by the combinatorial solver 106 and the quality metric value of the optimal solution, and then calculate "percentage error" as that difference divided by the quality metric value of the optimal solution. This calculation may represent a margin of added cost (as compared to the optimal solution). In another particular example, the evaluator may calculate the aforementioned difference, but then calculate the range of the solution space as the difference between the quality metric value of the optimal solution and the mean quality metric value. The evaluator may be configured to then calculate percentage error as the difference divided by the range, which may accurately characterize what may be interpreted as percentage error with clear upper (e.g., 100%) and lower (e.g., 0%) bounds.

To further illustrate example implementations of the present disclosure, consider two cases. In the first, one may be interested in a combinatorial problem family F, and wish to estimate the quality metric value of characteristic solutions to various combinatorial problems in that family. In the second, one may be interested in a specific combinatorial problem P, and wish to estimate the quality metric value of a characteristic solution to exactly that combinatorial problem.

A number of statements regarding combinatorial problems and their families may be stated without loss of generality. Every individual combinatorial problem P is at least a member of the family of problems ($F_P$) that are subsets of combinatorial problem P, and every individual combinatorial problem P may be a member of other families. Also, for every individual combinatorial problem P, there is a generator ($G_P$) that can generate subsets of combinatorial problem P and thereby generate members of a family of combinatorial problems similar to P, of various sizes. And if a family F of combinatorial problems has a common, describable attribute, such as the geometric distribution of cities in a TSP, then it is likely that there is a generator ($G_F$) that can generate members of that family, of various sizes.

Now consider a given combinatorial problem family F (that may be the family $F_P$ of combinatorial problems that are subsets of a combinatorial problem P), a given combinatorial problem P that is a member of that family, and a generator G (that may be a generator ($G_F$) for the family F or a generator ($G_P$) that can generate subsets of combinatorial problem P) capable of generating combinatorial problems in family F of various sizes. Now with F, P and G, the following steps may be performed to establish a function and use it to improve the quality of the solution produced by a combinatorial solver, the time required to find the solution, or both.

(1) Select a secondary measure M (e.g., the total duration of a TSP) the value of which for a given solution S may be determined by a valuation function V.

(2) Select a characteristic solution (e.g., a solution that has an average quality metric value, or a solution that has the best of all possible quality metric values).

(3) Select a second combinatorial solver C that is able, at least for small combinatorial problems in the family F, to create a characteristic solution S that can then be evaluated using the valuation function V. Notably, in instances in which this combinatorial solver finds only optimal solutions (those with the very best quality metric value), then all solutions created using the combinatorial solver will have the same quality metric value.

(4) Select a range of two or more sizes ($s_1$, $s_2$, $S_3$, . . . ) that may be sequential, may be separated by a common value, or may have no regular spacing.

(5) Select two numbers NP (for number of combinatorial problems) and NS (for number of solutions) of sufficient magnitude for a good statistical sample.

(6) For each size $s_i$:
Create a statistics collector $Z_i$ for size $s_i$,
Repeat the following NP times:
  Generate a combinatorial problem Q in family F of size $s_i$, using G (e.g., $Q=G(s_i)$),
  Repeat the following NS times:
    Generate a solution S to combinatorial problem Q using combinatorial solver C (e.g., $S=C(Q)$),
    Determine the value of the secondary measure M of S using V (e.g., $M=V(S)$), and
    Record the secondary measure M in statistics collector $Z_i$, End Repeat NS times,
End Repeat NP times,
Calculate the max, mean, min, variance, standard deviation of the secondary measure data (values) collected in $Z_i$,
End For each size.

(7) Considering the range of sizes ($s_1$, $s_2$, $S_3$, . . . ) and the secondary measure data collected in statistical collectors ($Z_1$, $Z_2$, $Z_3$, . . . ), determine the mathematical relationship between size $s_i$ and mean secondary measure $MM_i$ found in statistics collector $Z_i$. This may be accomplished using linear regression or other common mathematical methods. In practice, the most useful mathematical relationship may be between the square-root of size and the mean secondary measure, or between the size and the natural logarithm of the mean measure of interest. Other relationships are possible.

(8) Reduce this mathematical relationship to a function $f$ that will yield an estimated secondary measure EM given a specific size SS (e.g., $EM=f(SS)$).

(9) For the given combinatorial problem P of size s, using function f, determine the estimated secondary measure EM (e.g., $EM=f(s)$).

(10) Use the estimated secondary measure EM in a primary combinatorial solver (combinatorial solver 106) to improve the quality of its solution, the time required to find its solution, or both.

The above may be used to establish one relationship with size. In some examples, however, it may be applied twice with two different secondary measures of interest, by mapping sizes, one may determine the relationship between the two different secondary measures, as in relationship between mean and optimal, mean and heuristic solution, the like. This may also be applied to a greater number of secondary measures.

In instances in which combinatorial problems within a family of combinatorial problems have similar attributes but may have different dimension or scale, it may be desirable to normalize various ones of its measures such as the maximum, mean, minimum, optimal and the like by dividing by the problem standard deviation. In other instances in which combinatorial problems within a family of combinatorial problems have similar dimension or scale (as in, for example, sub-problems of a given problem), it may be less useful to normalize these measures. The mathematical model can be based upon the size of the problem, or its square root, or other function (such as natural logarithm) and the maximum, mean, minimum, optimal or other measure.

As indicated above, combinatorial problems have a number of different applications that may benefit from example implementations of the present disclosure. To further illustrate one suitable example, a navigational global positioning system (GPS) product may be designed to not only determine an optimal path from an origin to a destination by roads and highways, but also determine an optimal path through a collection of destinations that must be visited during some period of time. This may be beneficial for trucks that pickup or deliver packages at a number of individual destinations within a limited period of time, while adjusting to changing requirements (e.g., add or delete destination) and conditions (e.g., traffic, weather, accidents).

This GPS product may receive an indication of the origin and final destination (if different than origin), a list of one or more destinations, and a target completion time (e.g., total duration or time of day). The GPS product may estimate the shortest possible distance through the destinations and then estimate the shortest total duration, which may represent the metric value of the optimal solution. If the total duration exceeds the target completion time, the list of destinations may be modified, and the GPS product may again estimate the shortest possible distance and the shortest possible distance.

On acceptance of the estimated shortest possible distance, that distance may be used to guide the GPS product to determine a path through the destinations that does not exceed the estimated distance and duration. The GPS product may then prompt an operator to follow the route, which the GPS product may update or re-determine as traffic conditions change. Each change may begin with an estimate of a current delay, and an estimate of the total duration that may be required to complete the route if re-planned; and when confirmed, the GPS product may determine a new route with shortest duration. At any time during the route, the GPS product may receive additional destinations or direction to delete destinations, and again estimate total distance and duration for the destinations that have not yet been visited. On acceptance of these changes, the GPS product may again determine a path through these remaining destinations.

In another suitable example, consider advances in unmanned aerial vehicles (UAVs), which have been enabled by advances in communication and mobile computing technologies (e.g., smartphones, tablet computers, etc.) with small multi-core computer processors that draw only modest power. At the same time, commercial and military interests imagine and seek to implement artificial intelligence, largely autonomous mobile reconnaissance UAVs which can operate without constant wireless communications. This is a setting that largely benefits from the ability to execute high-value, compute intensive algorithms (e.g., autonomous route planning), without dependence upon continuous wireless communication and high-performance data center computers.

Example implementations of the present disclosure may be useful to increase if not maximize what can be accomplished with limited on-board computer resources. In this regard, example implementations may provide means to estimate the metric value of optimal solutions to combinatorial problems using simple, low-cost algorithms, and then to use that information to improve the speed and quality of solution returned by a combinatorial solver running on the on-board computer resources.

Also consider recent trends in the computing industry shifting toward the use of application-specific integrated circuits (ASICs), field-programmable gate arrays (FPGAs) and the like in order to efficiently perform special-purpose functions. A special-purpose computer processor may be implemented using ASICs, FPGSs and the like to both estimate the metric value of optimal solutions to combinatorial problems, and to execute high-value, compute intensive algorithms. This special-purpose processor could be a separate product that could then be embedded in a GPS product such as that described above, or in an artificial-intelligence, autonomous UAV.

For example, this technology could be applied in an artificial-intelligence, autonomous UAV configured to receive requests for aerial photography and automatically plan a sequence of observations (a dynamic traveling salesman problem), which may be re-planned in response to new or changed requests. This capability may be resident within the UAV and its computer system or contained within a GPS product customized to provide this capability. This capability is imaginable but may be possible only by improving what can be accomplished with the limited on-board computer resources or limited computer resources found within a GPS device such as that described above.

In another suitable example, consider a robotic drill (a machine) for printed circuit boards that has a feeder for a stack of printed circuit cards to be drilled (over a range of sizes), and means such as a socket for receipt of removable storage with a list of drilling locations. The drill may independently determine an efficient sequence of drilling operations without need for an operator defined sequence. The robotic drill may estimate the shortest possible distance through these locations and estimate the shortest total duration for each board, taking into account peak drill head movement speed and related factors, and the shortest total duration for the drilling all of the given boards. The robotic drill may then report this duration to an operator who can then elect to reduce, cancel, or accept the drilling job as-is. On acceptance, the robotic drill may use this estimate of the shortest possible distance through the locations to guide a combinatorial solver to determine the sequence of drilling locations that has the shortest distance and duration. After planning and verifying this sequence, the robotic drill will begin automatic drilling of the printed circuit cards place in the feeder.

In yet other suitable examples, implementations of the present disclosure may be useful to an aerial-survey UAV given a set of sites to survey, with ability to automatically optimize addition and deletion of new sites, or a warehouse robot to constantly optimize distance and time traveled while visiting stock locations to put and get individual products. Example implementations may also be useful for lumber delivery in which a truck arrives with load of stock lumber and includes robotic equipment to cut to specific sizes required by the structure being constructed with the lumber, while minimizing waste (another example of a combinatorial problem). In the aforementioned and other applications, the goal may be to enable operation of machines without sophisticated computer programs that run on other computers, and give them the ability to estimate and then plan their own activities including the ability to adapt to changes in the work to be performed. The estimate may be first used as a decision point (accept duration or modify plan), and then as a guide to generating a good if not optimal plan.

Figure 5:
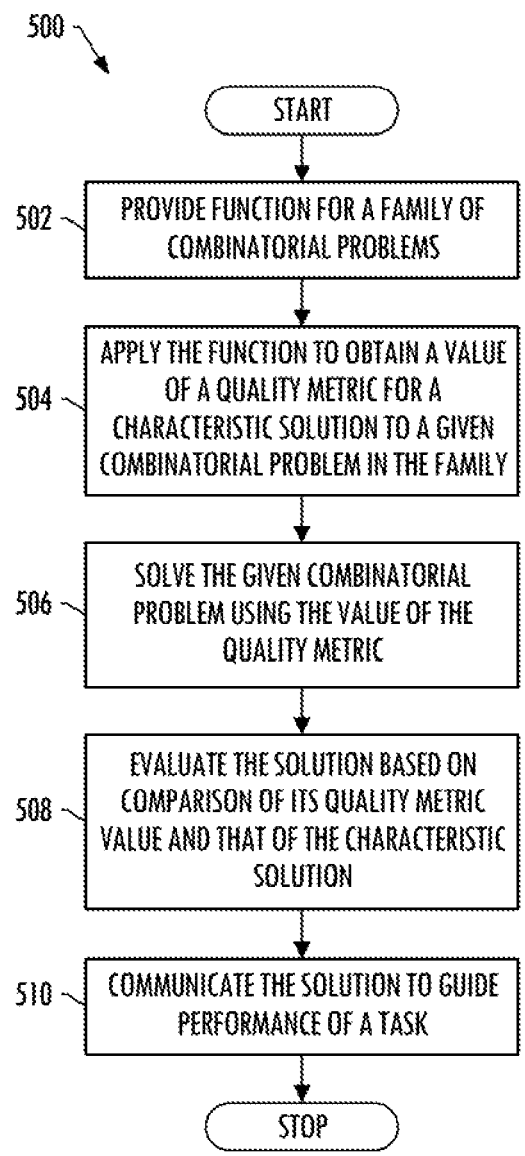
FIG. 5 is a flowchart illustrating various steps in a method of solving a given combinatorial problem, according to some example implementations.

FIG. 5 is a flowchart illustrating various steps in a method 500 of solving a given combinatorial problem, according to some example implementations of the present disclosure. As shown at block 502, the method may include providing a function that has been established for a family of combinatorial problems including the given combinatorial problem. For each combinatorial problem in the family, the function relates a secondary measure of the combinatorial problem to a quality metric of a characteristic solution to the combinatorial problem. The method may also include applying the function to a value of the secondary measure for the given combinatorial problem to obtain a value of the quality metric of the characteristic solution to the given combinatorial problem, as shown at block 504. The method may include solving the given combinatorial problem to obtain a solution to the given combinatorial problem, as shown at block 506. The method may include evaluating the solution based on comparison of a value of the quality metric of the solution, and the value of the quality metric of the characteristic solution, as shown at block 508. And in at least one instance based on the evaluation, the method may include communicating the solution to guide performance of a task, as shown at block 510.

Figure 6:
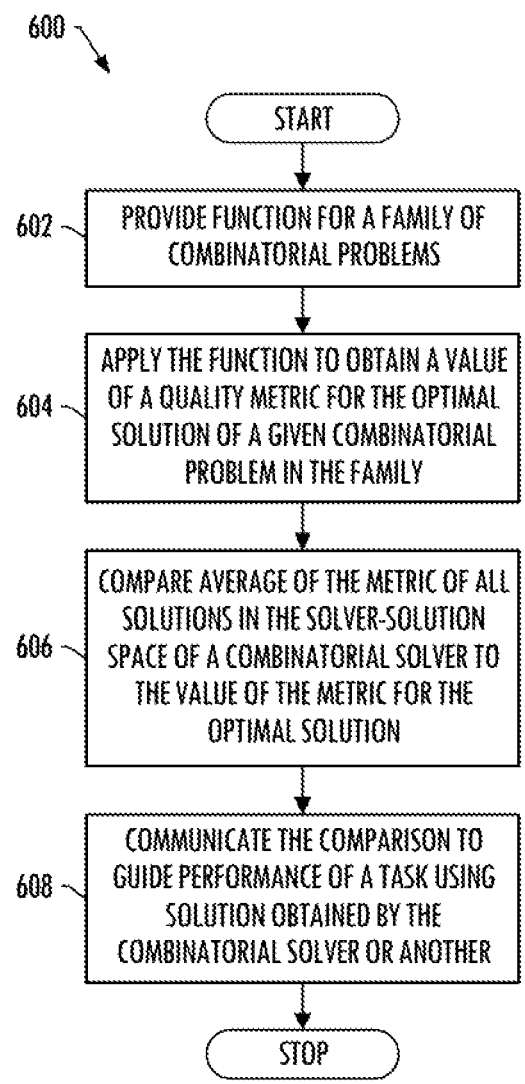
FIG. 6 is a flowchart illustrating various steps in a method of measuring the effectiveness of a combinatorial solver to solve a given combinatorial problem, according to some example implementations.

FIG. 6 is a flowchart illustrating various steps in a method 600 of measuring the effectiveness of a combinatorial solver to solve a given combinatorial problem, according to some example implementations of the present disclosure. As shown at block 602, the method may include providing a function that has been established for a family of combinatorial problems including the given combinatorial problem. For each combinatorial problem in the family, the function relates a secondary measure of the combinatorial problem to a quality metric of an optimal solution to the combinatorial problem. The method may also include applying the function to a value of the secondary measure for the given combinatorial problem to obtain a value of the quality metric of the optimal solution for the given combinatorial problem, as shown in block 604. The method may include comparing an average of the quality metric of all solutions to the combinatorial problem in a solver-solution space of the combinatorial solver, to the value of the quality metric of the optimal solution for the given combinatorial problem, as shown in block 606. And the method may include communicating the comparison to guide performance of a task using a solution obtained by the combinatorial solver or another combinatorial solver, as shown in block 608.

According to example implementations of the present disclosure, the system 100 and its subsystems including the function store 102, calculator 104, combinatorial solver 106, evaluator 108, 408 relation-analysis module 202 (including, e.g., second combinatorial solver 204 and function-definition module 206) and/or problem generator 302 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

Figure 7:
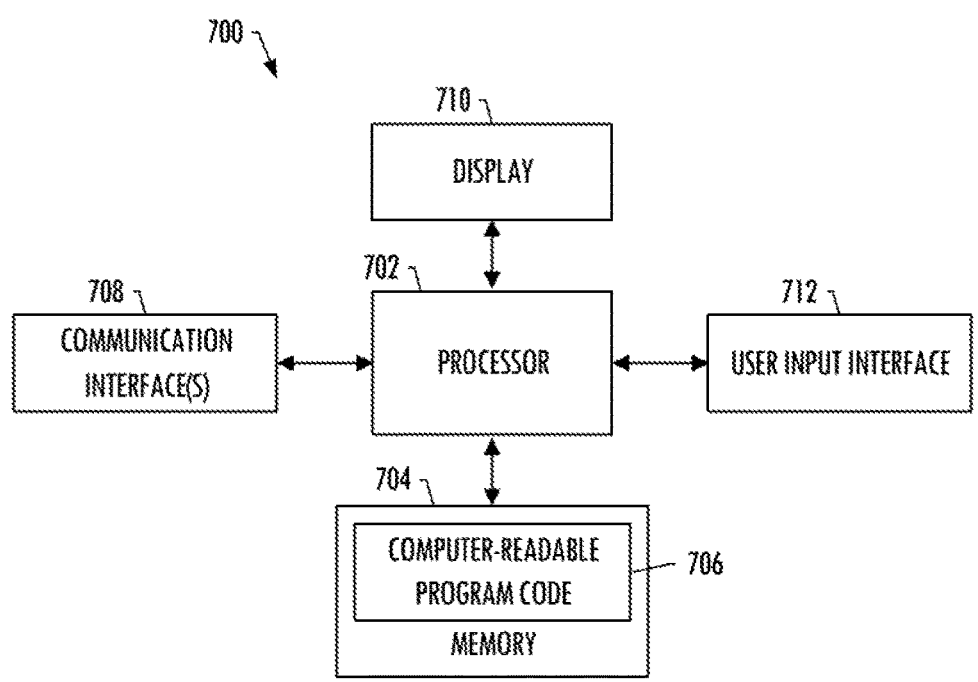
FIG. 7 illustrates an apparatus according to some example implementations.

FIG. 7 illustrates an apparatus 700 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 702 (e.g., processor unit) connected to a memory 704 (e.g., storage device).

The processor 702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 704 (of the same or another apparatus).

The processor 702 may be a number of processors, a multi-core processor or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more ASICs, FPGAs or the like. Thus, although the processor may be capable of executing a computer program to perform one or more functions, the processor of various examples may be capable of performing one or more functions without the aid of a computer program.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk—read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 704, the processor 702 may also be connected to one or more interfaces for displaying, transmitting and/or receiving information. The interfaces may include a communications interface 708 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 700 may include a processor 702 and a computer-readable storage medium or memory 704 coupled to the processor, where the processor is configured to execute computer-readable program code 706 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for executing a combinatorial solver to solve a given combinatorial problem, the apparatus comprising a processor and a memory storing executable instructions that in response to execution by the processor cause the apparatus to at least:
configure the processor with a value of a quality metric of a characteristic solution to the given combinatorial problem, including the apparatus being caused to:
provide a function that has been established for a family of combinatorial problems including the given combinatorial problem, for each combinatorial problem in the family, the function relating a secondary measure of the combinatorial problem to the quality metric of the characteristic solution to the combinatorial problem; and
apply the function to a value of the secondary measure for the given combinatorial problem to obtain the value of the quality metric of the characteristic solution to the given combinatorial problem; and
execute the combinatorial solver with the processor and using the value of the quality metric of the characteristic solution to at least:
solve the given combinatorial problem to obtain a solution to the given combinatorial problem;
evaluate the solution based on comparison of a value of the quality metric of the solution, and the value of the quality metric of the characteristic solution; and
communicate the solution in at least one instance based on the evaluation to guide performance of a task.

2. The apparatus of claim 1, wherein the characteristic solution to the combinatorial problem is an optimal solution to the combinatorial problem, or a best solution to the combinatorial problem obtainable by a given combinatorial solver, and
wherein the apparatus being caused to apply the function to the value of the secondary measure includes being caused to apply the function to the value of the secondary measure to obtain a value of the quality metric of the optimal solution or the best solution to the given combinatorial problem.

3. The apparatus of claim 1, wherein the quality metric of the characteristic solution is an average quality metric of all solutions to the combinatorial problem in a solver-solution space, and the characteristic solution to the combinatorial problem is a solution in the solver-solution space having the average quality metric value, and
wherein the apparatus being caused to apply the function to the value of the secondary measure includes being caused to apply the function to the value of the secondary measure to obtain an average of the quality metric of all solutions to the combinatorial problem in the solver-solution space.

4. The apparatus of claim 1, wherein the secondary measure is a size of the combinatorial problem, or a function of the size of the combinatorial problem.

5. The apparatus of claim 1, wherein the secondary measure is an average of the quality metric of all solutions to the combinatorial problem in a problem-solution space or a solver-solution space, or the standard deviation of the average of the quality metric.

6. The apparatus of claim 1, wherein the memory stores further executable instructions that in response to execution by the processor cause the apparatus to further establish the function from a plurality of second combinatorial problems in the family of combinatorial problems, including the apparatus being caused to at least:
execute a second combinatorial solver with the processor to solve the plurality of second combinatorial problems to obtain characteristic solutions thereto, the plurality of second combinatorial problems having respective values of the secondary measure; and
establish the function from the respective values of the secondary measure, and respective values of the quality metric of the characteristic solutions to the plurality of second combinatorial problems.

7. The apparatus of claim 6, wherein the memory stores further executable instructions that in response to execution by the processor cause the apparatus to further generate the family of combinatorial problems including the plurality of second combinatorial problems from the given combinatorial problem, each of the plurality of second combinatorial problems being a sub-problem of the given combinatorial problem.

8. A method of executing a combinatorial solver to solve a given combinatorial problem, the method comprising:
configuring a processor with a value of a quality metric of a characteristic solution to the given combinatorial problem, including:
providing a function that has been established for a family of combinatorial problems including the given combinatorial problem, for each combinatorial problem in the family, the function relating a secondary measure of the combinatorial problem to the quality metric of the characteristic solution to the combinatorial problem; and
applying the function to a value of the secondary measure for the given combinatorial problem to obtain the value of the quality metric of the characteristic solution to the given combinatorial problem; and
executing the combinatorial solver with the processor and using the value of the quality metric of the characteristic solution to at least:
solve the given combinatorial problem to obtain a solution to the given combinatorial problem;
evaluate the solution based on comparison of a value of the quality metric of the solution, and the value of the quality metric of the characteristic solution; and in at least one instance based on the evaluation; and
communicate the solution to guide performance of a task.

9. The method of claim 8, wherein the characteristic solution to the combinatorial problem is an optimal solution to the combinatorial problem, or a best solution to the combinatorial problem obtainable by a given combinatorial solver, and wherein applying the function to the value of the secondary measure includes applying the function to the value of the secondary measure to obtain a value of the quality metric of the optimal solution or the best solution to the given combinatorial problem.

10. The method of claim 8, wherein the quality metric of the characteristic solution is an average quality metric of all solutions to the combinatorial problem in a solver-solution space, and the characteristic solution to the combinatorial problem is a solution in the solver-solution space having the average quality metric value, and wherein applying the function to the value of the secondary measure includes applying the function to the value of the secondary measure to obtain an average of the quality metric of all solutions to the combinatorial problem in the solver-solution space.

11. The method of claim 8, wherein the secondary measure is a size of the combinatorial problem, or a function of the size of the combinatorial problem.

12. The method of claim 8, wherein the secondary measure is an average of the quality metric of all solutions to the combinatorial problem in a problem-solution space or a solver-solution space, or the standard deviation of the average of the quality metric.

13. The method of claim 8 further comprising establishing the function from a plurality of second combinatorial problems in the family of combinatorial problems, including:

execute a second combinatorial solver with the processor to solve the plurality of second combinatorial problems to obtain characteristic solutions thereto, the plurality of second combinatorial problems having respective values of the secondary measure; and establishing the function from the respective values of the secondary measure, and respective values of the quality metric of the characteristic solutions to the plurality of second combinatorial problems.

14. The method of claim 13 further comprising generating the family of combinatorial problems including the plurality of second combinatorial problems from the given combinatorial problem, each of the plurality of second combinatorial problems being a sub-problem of the given combinatorial problem.

15. A computer-readable storage medium for executing a combinatorial solver to solve a given combinatorial problem, the computer-readable storage medium being non-transitory and having computer-readable program code portions stored therein that in response to execution by a processor, cause an apparatus to at least:

configure the processor with a value of a quality metric of a characteristic solution to the given combinatorial problem, including the apparatus being caused to:

provide a function that has been established for a family of combinatorial problems including the given combinatorial problem, for each combinatorial problem in the family, the function relating a secondary measure of the combinatorial problem to the quality metric of the characteristic solution to the combinatorial problem; and apply the function to a value of the secondary measure for the given combinatorial problem to obtain the value of the quality metric of the characteristic solution to the given combinatorial problem; and execute the combinatorial solver with the processor and using the value of the quality metric of the characteristic solution to at least:

solve the given combinatorial problem to obtain a solution to the given combinatorial problem;

evaluate the solution based on comparison of a value of the quality metric of the solution, and the value of the quality metric of the characteristic solution; and in at least one instance based on the evaluation, communicate the solution to guide performance of a task.

16. The computer-readable storage medium of claim 15, wherein the characteristic solution to the combinatorial problem is an optimal solution to the combinatorial problem, or a best solution to the combinatorial problem obtainable by a given combinatorial solver, and wherein the apparatus being caused to apply the function to the value of the secondary measure includes being caused to apply the function to the value of the secondary measure to obtain a value of the quality metric of the optimal solution or the best solution to the given combinatorial problem.

17. The computer-readable storage medium of claim 15, wherein the quality metric of the characteristic solution is an average quality metric of all solutions to the combinatorial problem in a solver-solution space, and the characteristic solution to the combinatorial problem is a solution in the solver-solution space having the average quality metric value, and wherein the apparatus being caused to apply the function to the value of the secondary measure includes being caused to apply the function to the value of the secondary measure to obtain an average of the quality metric of all solutions to the combinatorial problem in the solver-solution space.

18. The computer-readable storage medium of claim 15, wherein the secondary measure is a size of the combinatorial problem, or a function of the size of the combinatorial problem.

19. The computer-readable storage medium of claim 15, wherein the secondary measure is an average of the quality metric of all solutions to the combinatorial problem in a problem-solution space or a solver-solution space, or the standard deviation of the average of the quality metric.

20. The computer-readable storage medium of claim 15 having further computer-readable program code portions stored therein that in response to execution by the processor, cause the apparatus to further establish the function from a plurality of second combinatorial problems in the family of combinatorial problems, including being caused to:

execute a second combinatorial solver with the processor to solve the plurality of second combinatorial problems to obtain characteristic solutions thereto, the plurality of second combinatorial problems having respective values of the secondary measure; and establish the function from the respective values of the secondary measure, and respective values of the quality metric of the characteristic solutions to the plurality of second combinatorial problems.

21. The computer-readable storage medium of claim 20 having further computer-readable program code portions stored therein that in response to execution by the processor, cause the apparatus to further generate the family of combinatorial problems including the plurality of second combinatorial problems from the given combinatorial problem, each of the plurality of second combinatorial problems being a sub-problem of the given combinatorial problem.

\* \* \* \* \*